United States Patent
Davidson (10) Patent No.: US 8,377,599 B2
(45) Date of Patent: Feb. 19, 2013

(54) METHODS, APPARATUSES, AND SYSTEMS FOR THE EXTENSIBLE AND RECYCLABLE USE OF SOLID MATTER IN THE SUPPLY CHAIN FOR THE GENERATION OF ELECTRICITY

(76) Inventor: Arthur Davidson, Pittsburgh, PA (US)

( * ) Notice: Subject to any disclaimer, the term of this patent is extended or adjusted under 35 U.S.C. 154(b) by 0 days.

(21) Appl. No.: 12/969,210

(22) Filed: Dec. 15, 2010

(65) Prior Publication Data
US 2011/0084487 A1    Apr. 14, 2011

Related U.S. Application Data

(60) Provisional application No. 61/286,982, filed on Dec. 16, 2009.

(51) Int. Cl.
| H01M 8/06 | (2006.01) |
| F01D 15/10 | (2006.01) |
| F02B 43/00 | (2006.01) |

(52) U.S. Cl. .................. 429/421; 290/52; 60/39.12
(58) Field of Classification Search .................. None
See application file for complete search history.

(56) References Cited

U.S. PATENT DOCUMENTS

| 4,358,291 | A | * | 11/1982 | Cuomo et al. | ............... 423/657 |
| 5,592,028 | A | | 1/1997 | Pritchard | |
| 5,761,896 | A | | 6/1998 | Dowdy et al. | |
| 5,950,418 | A | | 9/1999 | Lott et al. | |
| 6,907,735 | B2 | | 6/2005 | Wolff et al. | |
| 6,965,174 | B2 | | 11/2005 | Wobben | |
| 2008/0056986 | A1 | | 3/2008 | Woodall et al. | |
| 2008/0063597 | A1 | * | 3/2008 | Woodall et al. | ............... 423/657 |

* cited by examiner

Primary Examiner — Patrick Ryan
Assistant Examiner — Yoshitoshi Takeuchi
(74) Attorney, Agent, or Firm — Foley & Lardner LLP

(57) ABSTRACT

A system that stabilizes or supplements the variable power output from an external energy source by producing power from aluminum alloys. The aluminum alloy produces hydrogen from water, and also releases heat. During this process, the aluminum alloy is oxidized to alumina mixture, which can be recycled in a smelting unit to regenerate the aluminum alloy. The aluminum alloy can be easily transported in existing transportation system to different locations. The system produces electricity on-demand using portions of the existing power generation and transportation systems with minimal carbon footprint/emission.

4 Claims, 3 Drawing Sheets

METHODS, APPARATUSES, AND SYSTEMS FOR THE EXTENSIBLE AND RECYCLABLE USE OF SOLID MATTER IN THE SUPPLY CHAIN FOR THE GENERATION OF ELECTRICITY

CROSS-REFERENCE TO RELATED APPLICATIONS

This application claims the benefit of U.S. Provisional Patent Application No. 61/286,982, filed on Dec. 16, 2009, the entire disclosure of which is incorporated herein by reference for any and all purposes.

FIELD

The invention generally relates to renewable energy sources, low carbon electricity generation, prevention of climate change, energy security, rail commodity transportation, aluminum smelting and recycling, steam and gas turbines for electric power generation.

BACKGROUND

To reduce carbon emissions, renewable energy sources such as wind, solar, geothermal, and hydroelectric can be used to replace fossil hydrocarbons for production of electric power to be carried on an electrical grid. However, the use of renewable energy sources for power production is hampered by high costs, location restrictions and intermittent power output. In many cases, long range power lines bring power to the point of consumption hundreds, or even thousands of miles away from the energy source.

Conventional methods of electricity generation based upon coal require the mining of the coal, which is then typically transported by rail to a power plant. At the power plant, the coal is used to generate electricity, releasing fossil carbon dioxide and other pollutants into the atmosphere. In electrical generation from natural gas, the natural gas is piped to an incineration site where the gas is burned to eventually drive an electrical turbine. However, the burning of natural gas also releases fossil carbon to the atmosphere.

In an effort to reduce carbon emissions, alternative energy sources are being developed. For example, hydrogen can be used to produce power in an internal combustion engine, and hydrogen can also be used to produce power in fuel cells. However, even "clean" hydrogen is usually produced from reforming of fossil hydrocarbons, which has a large carbon footprint. Alternatively, hydrogen may be produced by the splitting of water, however, this requires a significant amount of energy. In addition, the storage and distribution of hydrogen is expensive.

SUMMARY

Methods of producing electricity and hydrogen from aluminum alloys are provided, as well as the use of these in the larger electrical grid. Such aluminum alloys react with water to produce an alumina mixture and hydrogen. The aluminum alloys include aluminum and also passivation preventing agents such as gallium (Ga), indium (In), and/or tin (Sn). As used herein the term passivation preventing agents refers to materials that prevent alumina formation on the surface the aluminum that can passivate the aluminum with respect to its reactivity with water.

In one aspect, a system is provided including a smelter, a reaction unit, and a turbine. According to various embodiments, the smelter has a power input ($P_S$) and an alumina mixture input flow rate where the alumina mixture is fed into the smelter and converted into an aluminum alloy at a flow rate ($A_S$). According to various embodiments, the reaction unit is where the aluminum alloy is reacted with water at flow rate ($A_R$), to form the alumina mixture, to generate heat and hydrogen. According to various embodiments, the turbine produces a power ($P_T$) using the hydrogen as a fuel, steam generated by the heat from the reactor, or both. According to various embodiments, the power ($P_T$) can supply power to an external load ($P_L$), In some embodiments, the aluminum alloy includes aluminum and one or more of Ga, In, or Sn. In some embodiments, the alumina mixture includes $Al_2O_3$, and one or more of Ga, In, or Sn.

In some embodiments, a portion of the power from the turbine ($P_T$) is used as power into the smelter ($P_S$). In some embodiments, an external energy source provides power ($P_1$) to smelter unit ($P_S$). In some embodiments, $P_1$ and $P_T$ are combined to provide power to the smelter ($P_S$) and the external load ($P_L$). In some embodiments, the smelter is an electrolytic smelter. In some embodiments, the external energy source includes nuclear, wind, solar, geothermal or hydroelectric energy.

In some embodiments, the system operates such that when $P_1 > P_L + P_S$, the flow rate ($A_R$) is kept at zero; when $P_1 < P_L + P_S$, the net accumulation rate for the aluminum alloy ($A_N$) is maximized in accordance with equation (1):

$$A_N = A_S - A_R = SP_S - (P_T/RT) \quad (1)$$

In equation (1), $P_S$ is the power required for the smelter in kW; S is the efficiency of the smelter unit in kg/kWh; R is the rate of energy production in the reaction unit in kWh/kg; T is the efficiency of the turbine; $A_S$ is the mass flow rate of aluminum alloy produced by the smelter and $A_R$ is the mass flow rate of aluminum alloy fed to the reaction unit in kg/hr.

In one aspect, a system for electricity production for supplying power to a load ($P_L$) includes a renewable energy source and a power generating system. In some embodiments, the renewable energy source includes a power output ($P_1$). In some embodiments, the power generating system includes a smelting unit, a reaction unit, and a turbine as described above, and a storage unit for collecting and distributing the aluminum alloy. In some embodiments, a portion of the aluminum alloy from the smelting unit is stored in an aluminum storage unit. In some embodiments, a portion of the aluminum alloy stored in the aluminum storage unit is transported to other locations by transportation systems including road, rail, sea or air transport. In some embodiments, the smelting unit and reaction unit are located in different locations and a portion of the aluminum alloy from the smelting unit is transported to the location of the reaction unit.

In one aspect, a method is provided for stabilizing or supplementing the electrical power output from a renewable energy source including the steps of: utilizing a portion of the power output from the renewable energy source to run a smelting unit to convert an alumina mixture to an aluminum alloy in a smelter; storing the aluminum alloy; reacting a sufficient amount of the aluminum alloy with water to form hydrogen, the alumina mixture and heat, to stabilize or supplement the power output from the renewable energy source; utilizing the hydrogen and heat to produce electricity; and recycling the alumina mixture in the smelting unit to form the aluminum alloy. In some embodiments, the renewable energy source includes wind, solar, or hydroelectric energy, or a combination of any two or more such renewable energy sources. In some embodiments, a turbine or fuel cell produces electricity from the hydrogen produced in the reactor. In some embodiments, the aluminum alloy includes Al and one or more of Ga, In and Sn. In some embodiments, the aluminum allow is 95% Al and 5% passivation preventing agent and the passivating agent comprises one or more of Ga, In or Sn. In some embodiment, the passivating agent includes Ga, In, and Sn, and the ratio of Ga, In and Sn in the passivation preventing agent is about 68:22:10.

In some embodiments, a controller determines the quantity of aluminum alloy to be reacted with water. In some embodiments the controller monitors values for the power output from the renewable power source ($P_1$), the power to the smelting unit ($P_S$) and/or the power required by the external load ($P_L$); sets flow rate of the aluminum alloy ($A_R$), where when $P_1$ is greater than the sum of $P_S$ and $P_L$, then, $A_R$ is kept at zero; where when $P_1$ is equal to or less than the sum of $P_S$ and $P_L$, then, the flow rate $A_R$ is controlled by maximizing the net accumulation rate for the aluminum alloy ($A_N$) in accordance with equation (1), above. In some embodiments, the controller monitors the amount of aluminum stored in an aluminum storage. In some embodiments, the controller adjusts the amount of aluminum to be transported.

DETAILED DESCRIPTION

In one aspect, a system is provided for stabilizing or supplementing the variable power output from an external energy source by producing power from aluminum alloys. In some embodiments, the system includes a unit in which the aluminum alloy is reacted with water to produce hydrogen in an exothermic reaction. The hydrogen and heat produced by the reaction can both be used to produce electricity. During this process, the aluminum alloy is oxidized into an alumina mixture, water, and metal mixture. The alumina mixture is then re-cycled in a smelting unit to regenerate the aluminum alloy. In some embodiments, other solid materials instead of, or in addition to, aluminum may be used, such as magnesium or silicon.

In the system, a smelting unit and a reactor unit are integrated in a larger system of power generation, transmission, and energy production. In one embodiment, energy is generated by the reaction of the aluminum alloy with water to generate hydrogen and heat. The generated hydrogen may be burned to further drive an electric generator, and the generated heat may be used to also drive an electric generator, for example, by further generation of steam from water in contact with the heat. The electricity generated as a result of the aluminum reaction with water (oxidation), may then be placed in electrical service on a larger electrical grid, or the electricity may be recycled back into the process to fuel the recycling of the generated alumina into aluminum via the smelter unit. To enhance the overall feature of being a green energy production process, i.e. a process which reduces the overall environmental impact with reduced fossil carbon production and emission, the smelter unit may be powered from an outside energy source such as nuclear, geothermal, wind, or solar power (e.g., photovoltaic arrays), or a combination of such energy sources. However, traditional carbon power sources such as natural gas, coal, or other carbon-based energy sources may be also used. Where such other sources can entirely drive the alumina mixture to aluminum alloy conversion, the energy generated from the aluminum oxidation in the reactor may be entirely put onto the grid. However, at times of the low power availability, energy from the aluminum oxidation may be used, in part, to drive the smelter operation. Excess energy from the outside energy sources may enter the grid for electrical transmission.

The system presented herein has several beneficial aspects. One such aspect is that the aluminum alloy and the alumina mixture are transportable. In other words, the aluminum alloy may be moved to the reactor site to generate electricity in a location far-removed from the site where it was generated. Likewise, the alumina mixture may be transported from the reactor site to a smelter unit which is far-removed from the reactor site. This allows flexibility in having centralized operations for each step. In another aspect, the fossil carbon footprint for the operation can be greatly reduced by relying on energy sources which do not create gases which are accepted to contribute to greenhouse effects in the earth's atmosphere. In addition, the overall carbon footprint may also be reduced including emissions from fossil and non-fossil sources. For example, nuclear, wind, and solar power have minimal carbon footprints and may be used to power the smelter units to reduce overall fossil carbon emissions of the system.

In some embodiments, the aluminum alloy may include aluminum and a passivation preventing agent. The passivation preventing agent prevents the outer layer of the aluminum alloy from being inactivated as alumina is produced during oxidation of the aluminum in reaction with water. The passivation preventing agent may include one or more of gallium (Ga), indium (In) and (Sn). In some embodiments, the passivation agent to Al ratio ranges from about 5:95 to about 95:5. In other embodiments, the ratio ranges from about 10:90 to about 90:10; from about 20:80 to about 80:20; from about 30:70 to about 70:30; or from about 40:60 to about 60:40, based upon weight percent (wt %). In some embodiments, the ratio is about 50:50 based upon wt %. In some embodiments, the aluminum alloy comprises Al and Ga. In such embodiments, the ratio of Al:Ga is about 28:72; 56:44; 70:30; 75:25; or 95:5 based upon wt %. Such aluminum alloys are described in U.S. Patent Publication 2008/0063597.

In other embodiments, the aluminum alloy includes Al and Ga. In other embodiments, the aluminum alloy includes Al and In. In other embodiments, the aluminum alloy includes Al and Sn. In other embodiments, the aluminum alloy includes Al, Ga, and In. In other embodiments, the aluminum alloy includes Al, Ga, and Sn. In other embodiments, the aluminum alloy includes Al, In, and Sn. In other embodiments, the aluminum alloy includes Al, Ga, In and Sn. In a corollary, the alumina mixture may include all of these same metal combinations, as the alumina mixture is formed from the aluminum alloy. In one embodiment, the aluminum alloy includes Al and a passivation preventing agent including Ga, In and Sn in a ratio of 95 wt % Al, and 5 wt % passivation preventing agent. In another embodiment, the aluminum alloy includes Al and a passivation preventing agent including Ga, In and Sn in a ratio of from about 50 wt % to about 95 wt % Al, and from about 5 wt % to about 50 wt % passivation preventing agent.

In some embodiments, the aluminum alloy includes from about 80:20 to about 20:80 based upon wt % of aluminum to gallium. In some such embodiments, the aluminum alloy includes from 80:20 based upon wt % of aluminum to gallium. In other embodiments, the aluminum alloy includes about 80:20 to about 20:80 based upon wt % of aluminum to indium. In other such embodiments, the aluminum alloy includes about 80:20 based upon wt % of aluminum to indium. In some embodiments, the metal alloy contains aluminum and the ratio of passivation prevention agents is about 50 wt % to about 80 wt % Ga, about 10 wt % to about 30 wt % In, and about 5 wt % to about 15 wt % Sn. In some embodiments, the ratios of metals in the passivation preventing agent is about 68:22:10 of Ga:In:Sn, respectively. In some embodiments, the aluminum alloy contains about 50 wt % Al, 34 wt % Ga, 11 wt % In, and 5 wt % Sn.

In some embodiments, the aluminum alloy is converted into the alumina mixture including alumina ($Al_2O_3$) and passivation preventing agent (Ga, In and/or Sn). The passivation preventing agent acts as a catalyst, and can be recovered and recycled. In some embodiments, the passivation preventing agents may go through the smelting process and may remain with the alumina in a mixture. In other embodiments, the passivation preventing agents may be separated from the alumina. In addition, the alumina mixture may be reconstituted by combining alumina with passivation preventing agents. In other embodiments, the alumina is recovered from the reactor as alumina, it is smelted to form the aluminum, which is then combined with recovered or newly introduced passivation preventing agents to form the aluminum alloy In some embodiments, the alumina mixture produced in the reactor is converted back to the aluminum alloy in the smelter by an electrolytic or thermochemical reduction reaction. In some embodiments, the Hall-Heroult process may be used to smelt the alumina mixture. In this process, the alumina mixture may be dissolved in a carbon-lined vat of molten cryolite in an electrochemical cell. A mixture of the cryolite with aluminum fluoride is electrolyzed by passing an electric current through the mixture. The electrochemical reaction results in aluminum deposition at the cathode and production of carbon dioxide at the anode. The aluminum can be collected and used to produce aluminum alloys. It is understood that other methods of producing aluminum alloys from the alumina mixture may be used. The aluminum may then be combined with passivation preventing agents prior to introduction into the reactor.

Figure 1:
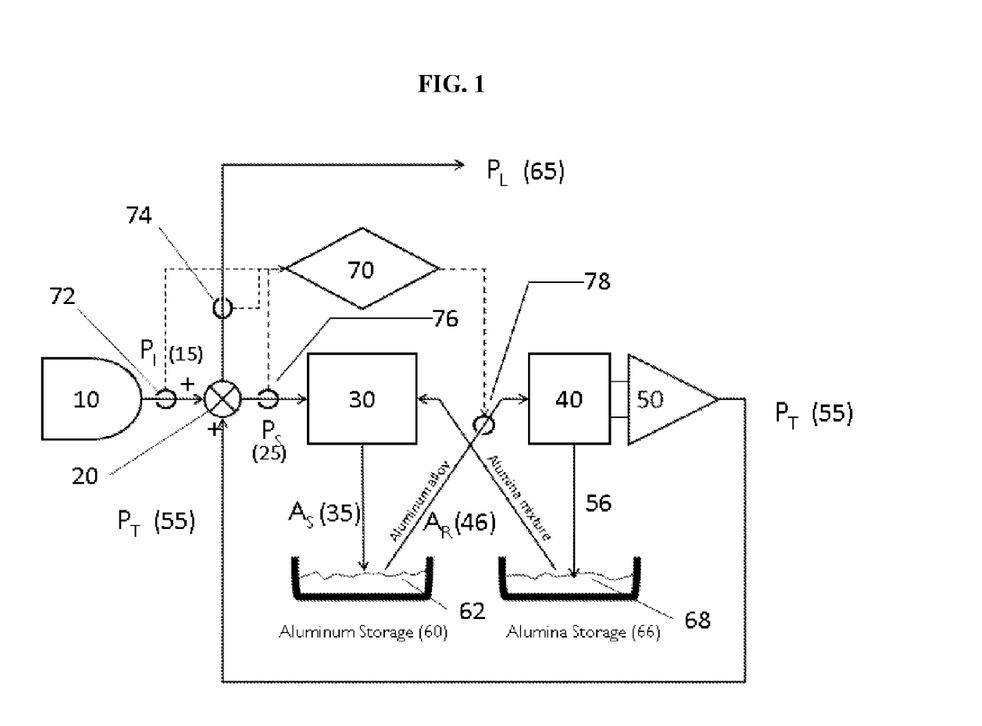
FIG. 1 is schematic of a system for producing power which includes aluminum alloy recycling, according to one embodiment.

Referring now to the figures, FIG. 1 is a symbolic representation of a system to utilize the aluminum alloy to store energy, and maximize the availability of a renewable energy source, such as from wind turbines. The system may include inventories of material, including the aluminum, alumina, electrodes for the Hall-Heroult process, electrolytes, process cooling fluids. The entire system may be localized in one area or distributed in different locations. If the system is distributed, materials such as the aluminum alloy or alumina may be transported for use in different locations allowing different communities to stabilize and supplement their power supply.

In one embodiment, the system comprises a smelter or smelting unit 30 which converts the alumina mixture into the aluminum alloy as shown in FIG. 1. An external power source 10 provides power 15 to an external load (such as the grid) 65 and may also provide power to the smelter 30. The smelter 30 produces aluminum alloy. The aluminum alloy is reacted in the reaction unit 40 producing hydrogen and heat. A power plant or turbine unit 50 produces power from the hydrogen and heat referred to as the supplemental power or feedback power. The amount of power to be generated from the reactor can be adjusted depending upon the particular energy production needs. As a non-limiting example, a power plant may have capacity of 500 MW to provide power to a small city.

The power required for the smelter is $P_S$. The aluminum alloy produced during the process may be collected in an aluminum storage unit 60 with an amount of aluminum alloy 62. In some embodiments, a portion of the aluminum alloy at mass flow rate ($A_R$) may be diverted to the reaction unit 40. In the reaction unit 40, the aluminum alloy is converted to the alumina mixture in the presence of an oxidizer such as water. This process produces hydrogen and heat which is used by the turbine 50 to produce electrical power. The alumina mixture may be collected in a alumina storage unit 66 with an amount of the alumina mixture 68. The alumina mixture 68 can be recycled in the smelter 30 and converted back into the aluminum alloy.

In some embodiments, the combination of the smelter 30 and reaction units 40 can be used to stabilize or supplement the power output from an external energy source 10. In particular, some renewable energy sources such as wind and solar are intermittent and may not be able to maintain a minimum power output. Thus, where the wind or solar production exceeds demand, the excess power generated can be diverted into the system described herein to "store" power as the aluminum. Then, when the wind or solar production sources are producing at rate less then demand requires, the aluminum may be fed to the reactor to produce enough energy to meet the demand of both the load and the smelter. It is also envisioned that embodiments of this system may be used in combination with a nuclear power plant, where the power output does not fall below a base level. If the power demand of the load decreases below the base level, the system may be able to store the energy in the aluminum alloy instead of dissipating the power as waste.

In some embodiments, the power output ($P_1$) from the external energy source may be variable. In some embodiments, power may be directed through an energy node or summing point 20 which can accept power from certain streams and direct the power to certain streams or units, consistent with the principle of conservation of energy. In one embodiment shown in FIG. 1. the energy node 20 distributes the power from the external source ($P_1$) and power from the turbine ($P_T$) into the smelter ($P_S$) and power for the external load ($P_L$). It is envisioned that a system with one or more energy nodes may be designed.

In some embodiments, the external energy source may be a renewable or non-renewable source, or a combination of such sources. Non-renewable sources with low carbon emissions include nuclear or power from fuel cells operating on fuels such as natural gas. Renewable sources include wind, solar, geothermal, and hydroelectric energy.

The use of the term "turbine" is understood to encompass any power production unit that can convert hydrogen and/or heat into power. In some embodiments, the turbine will produce sufficient energy to drive the smelter 30 and the external load $P_L$. In some embodiments, using a combination of turbines, fuel cells, internal combustion engines, Stirling engines and/or other known systems for producing power can also be envisioned. For example, the turbine may be a steam turbine whereby heat is used to generate steam that is then used to drive the turbine. In some embodiments, existing power plant components with or without modification can be used in this system. In this way, the system may built into existing facilities.

In some embodiments, a control unit 70 will control the system as shown in FIG. 1. The control unit 70 may monitor the power from the external source ($P_1$) and the power demand of the external load ($P_L$). In addition, the control unit 70 may monitor the power requirement of the smelting unit ($P_S$). Although the aluminum smelter 30 may prefer a steady power input, the power $P_S$ may change depending on the quantity of alumina mixture that is being smelted. If the external power source 10 cannot provide sufficient power for the smelter 30, some aluminum alloy 62 from the storage unit 60 may be diverted to the reaction unit 40 to produce the feedback power.

In some embodiments, the control unit 70 may change process parameters based on the process conditions. The control unit 70 may control process conditions to stabilize and supplement the power ($P_S$) into the smelter 30. Specifically, the control unit 70 may vary the process conditions in the reaction unit 40, rate of aluminum alloy into the reaction unit 40 ($A_R$), rate of the alumina mixture into the smelting unit 30, or any other process condition. The control unit may monitor or control the system at different control points including 72, 74, 76 and 78. In some embodiments, the control unit may maximize certain variables such as the rate of accumulation of the aluminum alloy by modifying process conditions.

In some embodiments, the control unit 70 monitors the amount of aluminum alloy 62 that is being accumulated in the storage unit 60. If the control unit is aware of a demand for aluminum alloy in a different location, the control unit 70 may set a specific amount of aluminum alloy to be transported to the location. In some embodiments, the control unit may also set an amount of alumina mixture 68 to be stored in storage unit 66 or transported to another location.

In some embodiments, the control unit 70 will monitor and minimize carbon emission from different parts of the system to calculate the carbon emission for the entire system ($C_{SYS}$). In some embodiments, the carbon emission of the transportation of the components and the transmission of power may also be calculated. In some embodiments, the carbon footprint of the entire system may be calculated. For example, the carbon emission from the smelting unit ($C_S$) can be low if the smelting anodes are fabricated from renewable biological sources, such as wood chips or switch grass. There are no carbon emissions from the reaction unit 40.

In one aspect, a system may be built near an external energy source such as a renewable energy or nuclear plant. Typically, nuclear and renewable energy plant may be located in a remote area, a significant distance away from customers who use the power. Instead of building long high voltage transmission lines to bring the electricity to the customers, the smelting unit 30 can be used to produce aluminum alloys near the location of the nuclear or renewable energy power plant. The aluminum alloy may then be moved to a reactor unit in a more convenient location for use and transmission of electricity to consumers. In some embodiments, the smelting unit may use bauxite ore to produce aluminum alloys. The aluminum alloy produced may be transported by rail, barges, ships or other mode of transportation to aluminum power plants closer to the customer.

Since the aluminum reaction unit 40 does not produce carbonaceous pollutants, it may be suitable to locate it in an urban area. The alumina mixture produced may be transported back to the smelting unit 30 for recycling. In this way, the carbon footprint of the system will be minimal while using existing infrastructure. Transporting aluminum alloy may be possible even when there are no transmission lines.

In some embodiments, the aluminum alloy may be directly recycled in a reaction unit 40 at the same site. In some embodiments, the aluminum alloy is stored either in the same location as the smelter 30 or at another location closer to the customers. In some embodiments, the aluminum alloy may be transported to another location for use in a different reaction unit or for another purpose. It is envisioned that the smelter unit 30 may be used to produce aluminum for general consumption. In some embodiments, the aluminum alloy may be stored or transported in a way to limit exposure to water by keeping the alloy in an inert atmosphere, submerged in an inert medium such as a liquid hydrocarbon, or stored in the presence of desiccants, or by appropriately covering the storage site or transport vehicle.

It is envisioned that some embodiments of the system provided may be used with flow batteries or other types of batteries. A flow battery is a rechargeable battery in which electrolyte containing one or more electroactive species flows through an electrochemical cell that converts chemical energy into electricity. In some embodiments, flow batteries or other batteries may be used in the system to store energy for quick retrieval of smaller amounts of power while the aluminum alloy can be stored for long-term use and can provide a large amount of power.

In some embodiments, the system may be integrated with a hydro-electric power system. The hydro-electric energy can be used as the external energy source 10 and also to supply water for the reaction with the aluminum alloy.

Figure 2:
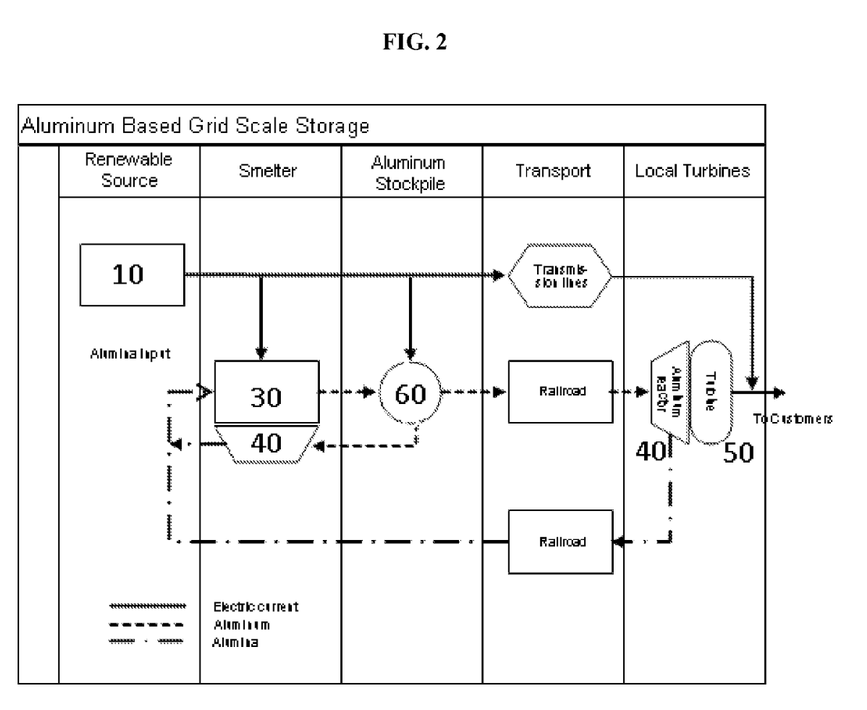
FIG. 2 is a schematic of a system for producing power from aluminum alloys, and its integration into a power supply grid, according to one embodiment.

One embodiment of the system is shown in FIG. 2. A wind farm 10 produces power for a smelter 30 and for distribution through the electric grid. The aluminum alloy formed is collected in storage unit 60. Some of aluminum alloy may be transported by rail to aluminum reactor 40 and turbine 50 units for production of electricity. The alumina mixture produced during the process can be transported back to the smelting unit 30 by rail. A portion of aluminum alloy may also be used in a reaction unit 40 to produce alumina mixture for the smelting process. In some embodiments, the alumina mixture that is produced is a hydrated alumina.

The invention having been generally described above, the following examples are provided as a non-limiting illustrations of the various embodiments.

EXAMPLES

Provided in the form of examples below, three embodiments for the system are described. The external power source is a wind farm 10. But, other external power sources can also be used. Even though the power output of the wind farm ($P_1$) can vary based on wind conditions, the system allows for a relatively stable power output to the external load ($P_L$) by producing power from aluminum alloys.

The conservation of energy at the junction 20 can be described by equation (2):

$$P_1 = P_S + P_L - P_T \qquad (2)$$

In equation 2, $P_T$ is the power produced by the turbine [kW], $P_S$ is the power required for the smelter [kW], $P_L$ is the power required for the external load or grid [kW], and $P_1$ is the power from the external energy source [kW].

The power to the smelter ($P_S$, 25) may be constant for efficient smelter operation. For the purpose of calculations, we will assume that $P_S$ is constant. The smelter 30 may produce a steady stream of aluminum alloy at the rate $A_S$ (35) in kg/hr. All or part of the aluminum alloy $A_R$ (46) in kg/hr may be diverted to the reaction unit 40 and then the turbine 50. The net aluminum alloy deposition rate ($A_N$) is given by equation (3):

$$A_N = A_S - A_R \qquad (3)$$

For sustainable operation, $A_N$ may have a positive value on average. Alumina mixture (56) is produced by reaction unit. All or part of the alumina mixture (68) may be recycled in the smelter.

The power produced by the turbine, $P_T$ (55) in kW can be calculated from the rate of aluminum reacted ($A_R$), the rate of energy production of the reactor (R) and the efficiency of the turbine according to equation (4), where T is the efficiency of the turbine:

$$P_T = A_R R T \quad (4)$$

For these examples, R=8.6 kWh/kg. The R value is the chemical energy available from the reaction per weight of aluminum alloy used. This is the chemical energy available from the reaction. The efficiency of converting it to electricity is a factor in the variable T, basically the turbine efficiency. The efficiency of the turbine, T, is the efficiency of converting the chemical energy into electricity. T may range from 0.15 to 0.5. In some embodiments, T may be increased by using a low temperature fuel cell to convert the hydrogen gas to electricity directly to about 0.6 or 60%. For the following calculations, T is assumed to be 0.3. In some embodiments, T is from about 0.15 to 0.5. In other embodiments, T is from 0.2 to 0.4. In other embodiments, T is about 0.3.

Example 1

When an energy source 10, for example a wind-farm, is supplying a surplus of energy and $P_1 > (P_L + P_S)$, $A_R$ can be kept at zero and $P_T$ will also be zero. Because of the surplus power from the wind farm, there is no need to react the aluminum alloy to produce power. The aluminum alloy that is produced by the smelter 30 can be stored in storage unit 60 or transported to another location.

The quantity of aluminum that can be smelted with power $P_S$ is represented in equation (5) as:

$$A_S = S P_S \quad (5)$$

In equation 5, S is the efficiency of the smelter units of kg/kWh and $P_S$ is the constant power required by the smelter. In some embodiments, S may vary between 0.06 and 0.09 kg/kWh depending on smelter design and conditions. In some embodiments, S is from 0.05 to 0.1 kg/kWh. In some embodiments S is from 0.06 to 0.08. As a non-limiting example, if $P_S$ is 100,000 kW (100 MW), the rate of aluminum production ($A_S$) will be about 7500 kg/h (or 7.5 tons per hour).

Example 2

When the energy source 10, for example a wind-farm, is not producing a surplus of energy and $P_1 < P_L + P_S$, $A_R$ must be greater than zero. In this example, power is needed from the aluminum alloy reaction and turbine unit to maintain the power output to the smelter ($P_S$) and the external load ($P_L$). The power from the turbine is represented in equation (6):

$$P_T = A_R R T = P_S + P_L - P_I \quad (6)$$

The value of R takes into account both the heat of reaction of aluminum alloy reaction with water and the combustion of the hydrogen gas released. In some embodiments, R is 0.86 kWh/kg. In some embodiments, T is 0.3 or 30%. Aluminum alloy is still produced by the smelter ($A_S$) given by Equation 5. The net rate of accumulation is given by equation (1):

$$A_N = A_S - A_R = S P_S - (P_T / R T) \quad (1)$$

In some embodiments, a controller 70 can maximize the value of the net accumulation rate for the aluminum alloy by controlling the process conditions such as $P_T$, $A_R$, etc.

Example 3

Since the power from the wind farm $P_1$ is variable, it is desirable to calculate how much variation in $P_1$ can be accommodated in Examples 1 and 2. Assuming $P_S$ and $P_L$ are held constant, a negative variation in $P_S$ will be reflected by an equal positive variation in $P_T$ according to Equation 1. $P_{T0}$ is the largest variation in $P_T$ that can still keep the average accumulation rate positive.

Given that the average of a function over a domain is the definite integral of the function over the domain divided by the size of the domain, and that the portion of the power domain in which the power source 10 is in surplus is defined as $P_W$ then the integral of the aluminum accumulation rate in Example 1, is Integral=$SP_S P_W$. The integral of the rate in Example 2 is Integral=$SP_S P_{T0} - (P_{T0}^2 / 2RT)$. The domain averaged over is $P_W + P_{T0}$. Accordingly, the average rate of accumulation over both cases and the whole domain is as equation 7:

$$\langle A_N \rangle = \frac{SP_S(P_W + P_{T0}) - P_{T0}^2 / 2RT}{P_W + P_{T0}} \quad (7)$$

Note that ($P_W + P_{T0}$), the sum of the Example 1 maximum power domain, and the Example 2 maximum turbine power, is the magnitude of the variation in power associated with source 10 over Example 1 and 2. Therefore it is possible to set equation 7 above to zero, and solve for ($P_W + P_{T0}$) as in equation 8:

$$\text{Power source variation} = P_W + P_{T0} = \frac{P_{T0}^2}{2 P_S S R T} \quad (8)$$

Equation 8 can be used to determine the relationship between $P_W$ and $P_S$. In some embodiments, if the overall efficiency of SRT=0.2, the variation of the source that can be accommodated sustainably is $P_S$ if we are willing to waste a maximum $P_W$=0.368 $P_S$. 2 $P_S$ can be accommodated if we can waste 1.11 $P_S$. Thus, large variations in the wind farm power output can be accommodated by the system.

Example 4

Figure 3:
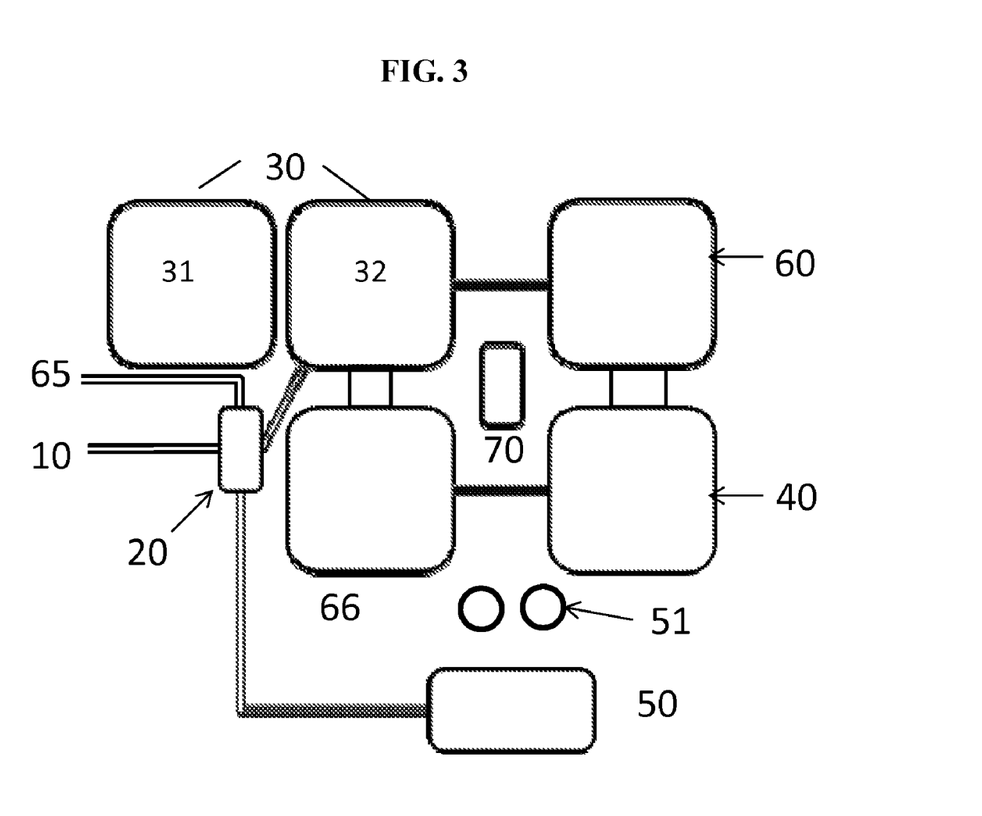
FIG. 3 is a schematic layout of an embodiment of the system.

FIG. 3 depicts how the components of the system can be arranged in one embodiment. Power from an external source 10 and power from the turbine 50 enter the power distribution node 20. The node 20 distributes power to the load 65 and the smelter 30. The smelter 30 may further include an array of electrolytic smelting pots 32 and carbon anode production line and other operations 31. Cooling towers 51 may be used to maintain the temperature of the system or components thereof. The system may include an aluminum alloy storage 60. All or part of the aluminum alloy may be diverted to the reactor 40 for producing power in conjunction with the turbine 50. The alumina mixture produced by the reactor may be stored in the storage unit 66. A control facility 70 may control the operation of the system including controlling the temperature of the smelting pots 32 and other components using the cooling towers 51. In some embodiments, the entire system may be located on one site as shown in FIG. 3.

The use of the terms "a" and "an" and "the" and similar referents in the context of describing the elements (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. Additionally, the terms and expressions employed herein have been used as terms of description and not of limitation, and there is no intention in the use of such terms and expressions of excluding any equivalents of the features shown and described or portions thereof, but it is recognized that various modifications are possible within the scope of the invention claimed. Additionally the phrase "consisting essentially of" will be understood to include those elements specifically recited and those additional elements that do not materially affect the basic and novel characteristics of the claimed invention. The phrase "consisting of" excludes any element not specifically specified.

The present disclosure is not to be limited in terms of the particular embodiments described in this application. Many modifications and variations can be made without departing from its spirit and scope, as will be apparent to those skilled in the art. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods, reagents, compounds compositions or biological systems, which can, of course, vary. It is also to be understood that the terminology used herein is for the purpose of describing particular embodiments only, and is not intended to be limiting.

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, particularly in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein can be readily broken down into a lower third, middle third and upper third, etc. As will also be understood by one skilled in the art all language such as "up to," "at least," "greater than," "less than," and the like include the number recited and refer to ranges which can be subsequently broken down into subranges as discussed above. Finally, as will be understood by one skilled in the art, a range includes each individual member.

All publications, patent applications, issued patents, and other documents referred to in this specification are herein incorporated by reference as if each individual publication, patent application, issued patent, or other document was specifically and individually indicated to be incorporated by reference in its entirety. Definitions that are contained in text incorporated by reference are excluded to the extent that they contradict definitions in this disclosure.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

What is claimed is:

1. An aluminum plant comprising:
    a smelter comprising a power input ($P_S$) and an alumina mixture input flow rate and wherein the smelter is configured to converts the alumina mixture to an aluminum alloy at a flow rate ($A_s$);
        wherein the smelter is connected to an external energy source that provides a power ($P_L$)
    a reactor unit comprising a reactor connected to a water supply and the smelter, and configured to react the aluminum alloy with water at a flow rate ($A_R$) to generate $H_2$ and heat; and
    a turbine connected to the reactor unit so that it produces power ($P_T$) from the heat, by combustion of the $H_2$, by use of the $H_2$ in a fuel cell, or a combination of any two or more thereof;
    wherein:
        a portion of $P_T$ is electrically connected to an external load, $P_L$;
        the smelter ($P_S$) and external load ($P_L$) are electrically connected to receive power from both the external energy source that provides $P_L$ and to the turbine that provides power $P_T$, wherein said electrical connection is at least one energy node that distributes power;
        said energy node is located within the aluminum plant;
        the aluminum alloy comprises Al and the aluminum alloy further comprises one or more of Ga, In, or Sn; and
        the alumina mixture comprises $Al_2O_3$, and the alumina mixture further comprises one or more of Ga, In, or Sn.

2. The apparatus of claim 1, wherein the smelter is an electrolytic smelter.

3. The apparatus of claim 1, wherein the external energy source comprises nuclear, wind, solar, geothermal or hydroelectric energy.

4. The apparatus of claim 1, wherein:
    when $P_1 > P_L + P_S$, the flow rate ($A_R$) is kept at zero;
    when $P_1 < P_L + P_S$, the net accumulation rate for the aluminum alloy ($A_N$) is maximized in accordance to the equation $$A_N = A_S - A_R = SP_S - P_T/RT$$

wherein:
        $P_S$ is the power required for the smelter in kW;
        S is the efficiency of the smelter unit in kg/kWh;
        R is the rate of energy production in the reaction unit in kWh/kg;
        T is the efficiency of the turbine;
        $A_R$ is the mass flow rate of aluminum alloy fed to the reaction unit in kg/hr
        $A_S$ is the rate of production of aluminum alloy by the smelter in kg/hr.

* * * * *

UNITED STATES PATENT AND TRADEMARK OFFICE
CERTIFICATE OF CORRECTION

PATENT NO. : 8,377,599 B2
APPLICATION NO. : 12/969210
DATED : February 19, 2013
INVENTOR(S) : Arthur Davidson Page 1 of 1

It is certified that error appears in the above-identified patent and that said Letters Patent is hereby corrected as shown below:

In Column 12, Claim 1, Line 11, change the word "converts" to --convert--.

In Column 12, Claim 1, Line 14, change the words "power ($P_L$)" to --power ($P_l$)--.

In Column 12, Claim 1, Line 28, change the words "provides $P_L$" to --provides $P_l$--.

Signed and Sealed this
Second Day of April, 2013

Teresa Stanek Rea
*Acting Director of the United States Patent and Trademark Office*